United States Patent
Tanaka

(10) Patent No.: US 8,953,582 B2
(45) Date of Patent: Feb. 10, 2015

(54) INFORMATION DELIVERY SYSTEM AND INFORMATION DELIVERY METHOD USING THE SAME

(75) Inventor: Masashi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 1395 days.

(21) Appl. No.: 12/101,305

(22) Filed: Apr. 11, 2008

(65) Prior Publication Data

US 2008/0253364 A1 Oct. 16, 2008

(30) Foreign Application Priority Data

Apr. 11, 2007 (JP) ................................. 2007-103374

(51) Int. Cl.
| | |
|---|---|
| H04L 12/66 | (2006.01) |
| H04L 29/08 | (2006.01) |
| H04W 4/02 | (2009.01) |

(52) U.S. Cl.
CPC *H04L 67/24* (2013.01); *H04W 4/02* (2013.01)
USPC ....................................................... 370/352

(58) Field of Classification Search
None
See application file for complete search history.

(56) References Cited

U.S. PATENT DOCUMENTS

| 7,701,925 B1* | 4/2010 | Mason et al. ................. 370/352 |
|---|---|---|
| 2002/0035605 A1* | 3/2002 | McDowell et al. ........... 709/206 |
| 2004/0093426 A1* | 5/2004 | Sahasrabudhe et al. ....... 709/238 |
| 2005/0021773 A1* | 1/2005 | Shiga et al. ................... 709/228 |
| 2005/0122943 A1* | 6/2005 | Hyun et al. .................... 370/338 |
| 2006/0215595 A1* | 9/2006 | Hancock et al. .............. 370/328 |
| 2006/0224362 A1* | 10/2006 | Ito .................................. 702/188 |
| 2007/0010275 A1* | 1/2007 | Kiss ............................... 455/521 |
| 2007/0019622 A1* | 1/2007 | Alt et al. ........................ 370/352 |
| 2007/0026871 A1* | 2/2007 | Wager ......................... 455/456.1 |
| 2007/0069888 A1* | 3/2007 | Parameswar ............. 340/539.13 |
| 2007/0077922 A1* | 4/2007 | Kim et al. .................. 455/414.2 |
| 2007/0088839 A1* | 4/2007 | Yoakum ........................ 709/228 |
| 2007/0124393 A1* | 5/2007 | Maes ............................. 709/206 |
| 2007/0243870 A1* | 10/2007 | Bantukul .................... 455/435.1 |
| 2007/0280453 A1* | 12/2007 | Kelley et al. ............. 379/201.01 |
| 2008/0125157 A1* | 5/2008 | Zhang ........................... 455/518 |

(Continued)

FOREIGN PATENT DOCUMENTS

| JP | 2002329131 A | 11/2002 |
|---|---|---|
| JP | 2003256517 A | 9/2003 |

(Continued)

OTHER PUBLICATIONS

European Search Report for EP 08 15 4205 completed May 7, 2009.

(Continued)

*Primary Examiner* — Suk Jin Kang
(74) *Attorney, Agent, or Firm* — Sughrue Mion, PLLC

(57) ABSTRACT

A mobile type service provider terminal registers a service providing area to a presence management server before a service starts. The presence management server creates a status management table of the mobile type service provider terminal. When the presence of the mobile type service provider terminal is detected in an area, the terminal registers information contents, which are delivered to subscribers, to an information delivery server. When the information delivery server stores the registered information contents to an information contents database and completes the creation of an information providing table, it notifies a service control server of the information. The service control server creates a message with reference to the information notified from the information delivery server and delivers it to the subscribers.

17 Claims, 12 Drawing Sheets

(56) References Cited

U.S. PATENT DOCUMENTS

| | | | |
|---|---|---|---|
| 2009/0077189 A1* | 3/2009 | Requena | 709/206 |
| 2010/0205248 A1* | 8/2010 | Mason et al. | 709/203 |
| 2011/0149956 A1* | 6/2011 | Alt et al. | 370/352 |
| 2012/0207151 A1* | 8/2012 | Alt et al. | 370/354 |
| 2014/0057660 A1* | 2/2014 | Wager | 455/456.3 |

FOREIGN PATENT DOCUMENTS

| | | |
|---|---|---|
| JP | 2006025184 A | 1/2006 |
| JP | 2006217195 A | 8/2006 |
| JP | 2006279142 A | 10/2006 |
| WO | 0165455 A | 9/2001 |

OTHER PUBLICATIONS

"Series Y: Global Information Infrastructure, Internet Protocol Aspects and Next-Generation Networks, Next Generation Networks—Frameworks and functional architecture models," General Overview of NGN, International Telecommunication Union (ITU)-T Advice Y.2001, Dec. 2004.

Japanese Office Action for JP2007-103374 issued Dec. 27, 2011.

\* cited by examiner

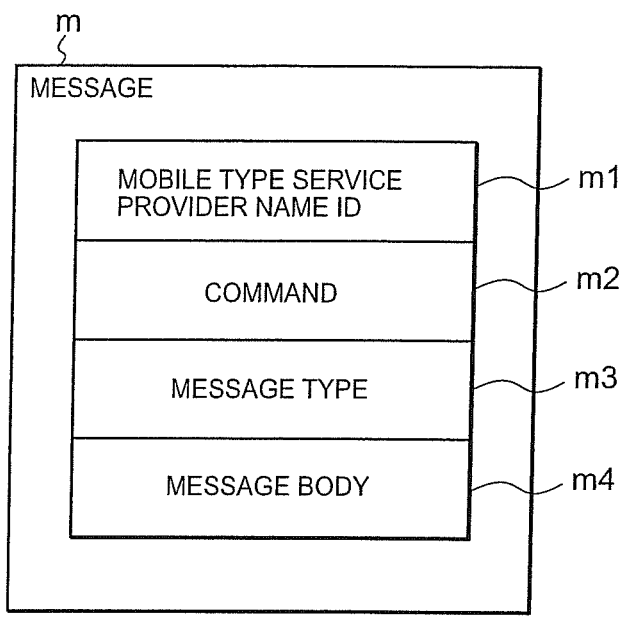

FIG. 9

| USER MANAGEMENT TABLE | | |
|---|---|---|
| 311 | 312 | 313 |
| AREA INFORMATION | MOBILE TYPE SERVICE PROVIDER | SERVICE UTILIZING USER |
| A | PROVIDER a | SUBSCRIBER #1 |
| | PROVIDER b | SUBSCRIBER #2<br>SUBSCRIBER #N |
| N | PROVIDER a | SUBSCRIBER #1<br>SUBSCRIBER #N |
| | PROVIDER c | SUBSCRIBER #1<br>SUBSCRIBER #2 |

| 41 MOBILE TYPE SERVICE PROVIDER SERVICE INFORMATION PROVIDING TABLE | | | | |
|---|---|---|---|---|
| 411 AREA INFORMATION | 412 MOBILE TYPE SERVICE PROVIDER | 413 CONTENTS LIST | 414 TYPE | 415 CONTENTS ACCESS INFORMATION |
| A | PROVIDER a | TITLE #a1 | a1a1 | |
| | | TITLE #a2 | a2a2 | |
| | PROVIDER b | TITLE #b1 | b1b1 | |
| | | TITLE #b2 | b2b2 | |
| N | PROVIDER a | TITLE #a1 | a1a1 | |
| | | TITLE #a2 | a2a2 | |
| | PROVIDER c | TITLE #c1 | c1c1 | |
| | | TITLE #c2 | c2c2 | |

INFORMATION DELIVERY SYSTEM AND INFORMATION DELIVERY METHOD USING THE SAME

This application is based upon and claims the benefit of priority from Japanese patent application No. 2007-103374, filed on Apr. 11, 2007, the disclosure of which is incorporated herein in its entirety by reference.

FIELD OF THE INVENTION

The present invention relates to an information delivery system and an information delivery method used to the information delivery system, and more particularly, to an information delivery system making use of a presence in a next generation network.

DESCRIPTION OF THE RELATED ART

Recently, next generation networks are constructed by telecommunication firms (or carriers). The next generation network is abbreviated as NGN (refers to, for example, Non-Patent Document 1: ITU-T Advice Y.2001 (December, 2004), "General Overview of NGN"). In the next generation network, it is expected to reduce the purchasing cost of equipment for constructing the next generation network and the operation and maintenance cost of the network by realizing the communication of the voice of a phone and the like, an image, and data on a common communication basis making use of an IP (Internet protocol) technology.

ETSI (European Telecommunication Standards Institute) and ITU-T (International Telecommunication Union Telecommunication Standardization Sector), which are organizations for standardization, carry out standardization of protocols for realizing the next generation network.

Although the existing IP networks such as the Internet, and the like are advantageous in that their cost is low, they do not always guarantee the stability and the reliability of communication. However, many of the next generation networks employ a method of establishing sessions between servers and terminals (clients) and managing and guaranteeing a communication band and communication quality of each of the sessions. As a result, the next generation networks can guarantee the stability and the reliability of communication as compared with the existing IP networks.

A session control protocol used for securing a communication band and communication quality in the next generation networks, is, for example, SIP (Session Initiation Protocol). SIP has not only a function for controlling a session between a server and a terminal (client) but also a function for sending and receiving a message (the SIP/MESSAGE) between the servers and the terminals (clients) and a presence function for ordinarily notifying the existence and the status of everything using SIP. It is widely examined to provide various types of services making use of the presence function.

SUMMARY OF THE INVENTION

A service providing mode making use of a presence is such that clients subscribing to a service are movers and a service provider delivers service information to the clients by using the change of the presence information of one client as a trigger.

Accordingly, the service providing system making use of the conventional presence provides a service only to limited clients, that is, only to mobile clients, and there is not an effective service providing system for providing a service to stationary clients making use of a presence.

Thus, an exemplary object of the present invention is to provide an information delivery system for permitting clients to obtain a service of a mobile type service provider in a service providing area which the clients registered.

Further, another exemplary object of the present invention is to provide an information delivery method suitable to the above information delivery system.

In an information delivery system according to an aspect of the present invention, a mobile type service provider terminal moves in a service providing area and provides a service to a subscriber terminal in the vicinity of the service providing area. The information delivery system comprises a presence management server that manages presence information of the service provider terminal.

In addition, the information delivery system may further comprise an information delivery server that previously registers and manages the information which is desired to be delivered from the service provider terminal to the subscriber terminal and a service control server that notifies a subscriber terminal participating to the service of the service provider of the delivery of the information registered to the information delivery server when the status of presence of the service provider changes.

An information delivery method according to an aspect of the present invention is used to an information delivery system in which a mobile type service provider terminal moves in a service providing area and provides a service to a subscriber terminal in the vicinity of the service providing area. In the information delivery method, a presence management server manages the presence information of the service provider terminal.

That is, the information delivery system of the present invention is a system in which a service provider as a service providing side, in particular, a service provider, which moves in a service providing area by a mobile traffic means (vehicle, bus, and the like) provides a service to clients (terminals) in the vicinity of the area, and a presence management server manages the presence information of the mobile type service provider.

Further, in the information delivery system of the present invention, when the status of the presence of the mobile type service provider changes, a service control server delivers information to the clients (terminals) participating to the service. In this case, the mobile type service provider manages the information, which it desires to deliver to the clients (terminals), by previously registering the information to an information delivery server.

The information, which the mobile type service provider desires to deliver to the clients (terminals) previously registered to the information delivery server, can be updated even while the mobile type service provider moves. Accordingly, the mobile type service provider can deliver the latest information to the clients (terminals) even while it moves.

As described above, in the information delivery system and the information delivery method of the present invention, since the status of the mobile type service provider, which provides the service while it moves, is managed as the presence, the clients (terminals) can obtain the service of the mobile type service provider in the service providing area which they registered.

In the information delivery system and the information delivery method of the present invention, since the mobile type service provider previously registers the information which is delivered to the information delivery server as information contents and delivers the information contents to subscribers as it moves, the clients (terminals) can accurately recognize the status of the service of the mobile type service provider.

Further, in the information delivery system and the information delivery method of the present invention, whether or not the mobile type service provider exists in a particular area is managed as the presence and the information contents are delivered to the clients (terminals) which registered to obtain the service. As a result, the mobile type service provider can obtain the clients (terminals), who are connected to a fixed network as well as wait for the mobile type service provider to come to an adjacent area and provide a service and provide the service to the clients (terminals).

A presence management server according to an aspect of the present invention is for an information delivery system in which a mobile type service provider terminal moves in a service providing area and provides a service to a subscriber terminal in the vicinity of the service providing area. The presence management server comprises a table section for managing the status of the service provider and a presence management section for managing the presence of the service provider terminal.

An information delivery server according to an aspect of the present invention is for an information delivery system in which a mobile type service provider terminal moves in a service providing area and provides a service to a subscriber terminal in the vicinity of the service providing area. The information delivery server comprises a table section for managing the information of the service providing area, the information of the service provider, contents list information, and contents type information and comprises an information delivery section. The information delivery server previously registers and manages the information which is desired to be delivered from the service provider terminal to the subscriber terminal.

A service control server according to an aspect of the present invention is used to an information delivery system, in which a mobile type service provider terminal moves in a service providing area and provides a service to a subscriber terminal in the vicinity of the service providing area, together with the above mentioned information delivery server. The service control server comprises a table section for managing the information of the service providing area, the information of the service provider, and the information of a service utilizing user. The service control server notifies a subscriber terminal participating to the service of the service provider of the delivery of the information registered to the information delivery server when the status of presence of the service provider changes.

The present invention is advantageous in that the arrangement and the operation described above permit the clients to obtain the service of the mobile type service provider in the service providing area which they registered.

BRIEF DESCRIPTION OF THE DRAWINGS

FIG. 7 is a view showing an example of a message according to the first exemplary embodiment of the present invention;

FIG. 8 is a view showing an example of a mobile type service provider status management table shown in FIG. 3;

FIG. 9 is a view showing an example of a user management table shown in FIG. 4;

FIG. 10 is a view showing an example of a mobile type service provider service information providing table shown in shown in FIG. 5;

DESCRIPTION OF THE PREFERRED EMBODIMENTS

Next, embodiments of the present invention will be explained with reference to the drawings.

First Exemplary Embodiment

Figure 1:
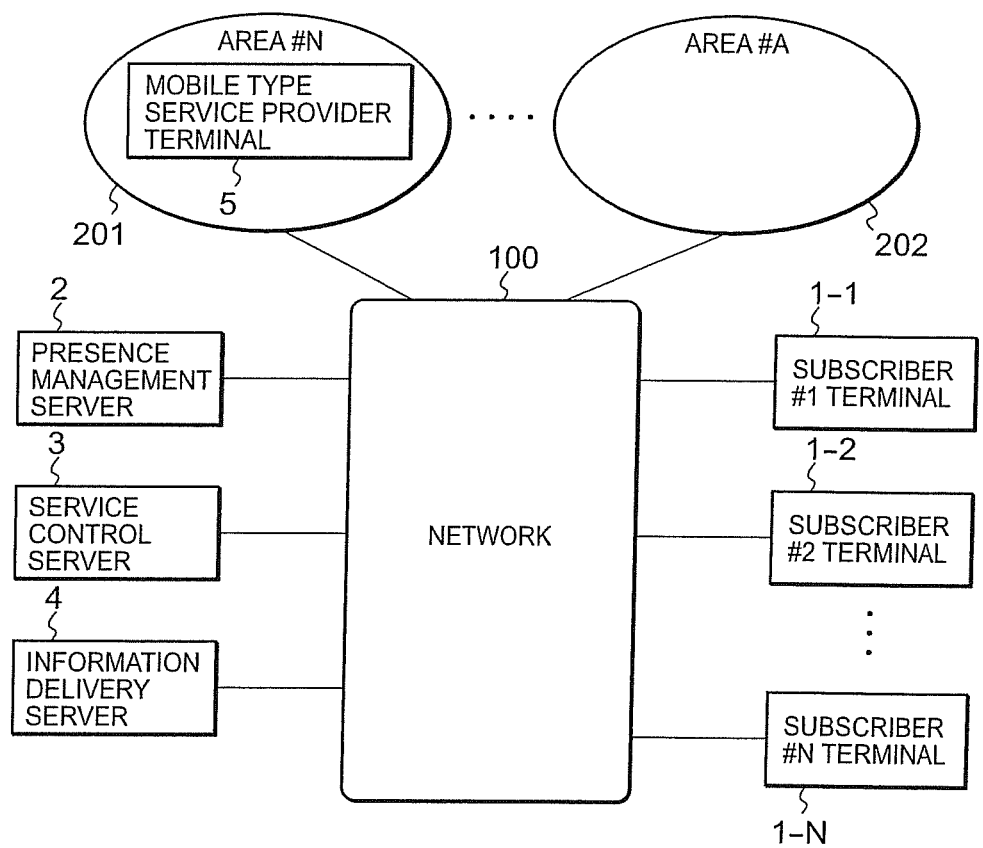
FIG. 1 is a block diagram showing an example of an information delivery system according to a first exemplary embodiment of the present invention.

FIG. 1 is a block diagram showing an example of an information delivery system according to a first exemplary embodiment of the present invention. In FIG. 1, the information delivery system according to the first exemplary embodiment of the present invention includes a presence management server 2, a service control server 3, and an information delivery server 4. The presence management server 2, the service control server 3, and the information delivery server 4 can be connected to a subscriber #1 terminal 1-1, a subscriber #2 terminal 1-2, . . . , a subscriber #N terminal 1-N (N is a positive integer) through a network 100. Further, an area (#A) 202, . . . , an area (#N) 201 are shown as service providing areas, and it is shown as a typical example that a mobile type service provider terminal 5 exists in the area (#N) 201. The presence management server 2, the service control server 3, and the information delivery server 4 can be also connected to the mobile type service provider terminal 5 through the network 100.

Figure 2:
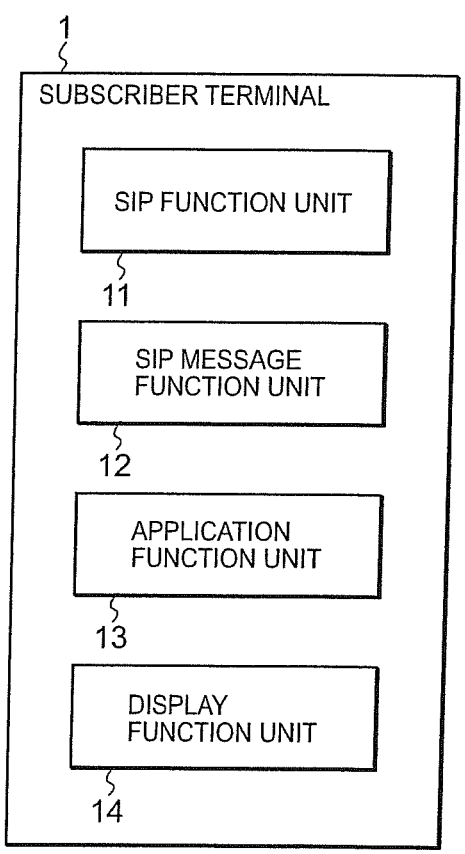
FIG. 2 is a block diagram showing an example of a subscriber terminal shown in FIG. 1.

FIG. 2 is a block diagram showing an example of one of the plurality of subscriber terminals shown in FIG. 1. In FIG. 2, a subscriber terminal 1 includes an SIP (Session Initiation Protocol) function unit 11, an SIP message function unit 12, an application function unit 13, and a display function unit 14. Note that the subscriber #1 terminal 1-1, the subscriber #2 terminal 1-2, . . . , the subscriber #N terminal 1-N have the same arrangement as the subscriber terminal 1.

Figure 3:
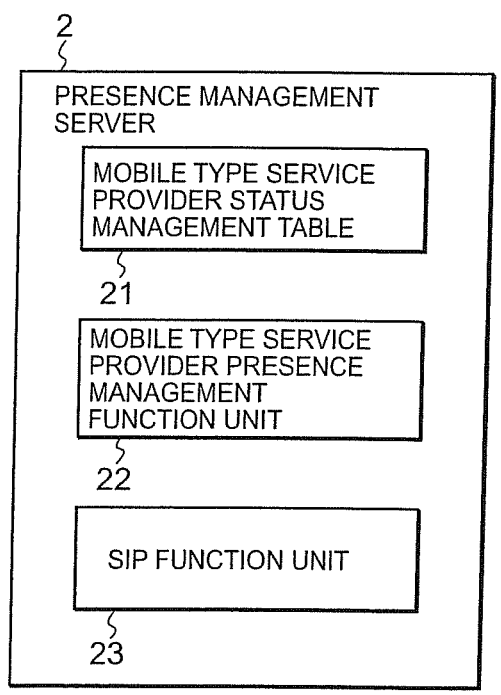
FIG. 3 is a block diagram showing an example of a presence management server shown in FIG. 1.

FIG. 3 is a block diagram showing an example of the presence management server 2 shown in FIG. 1. In FIG. 3, the presence management server 2 includes a mobile type service provider status management table 21, a mobile type service provider presence management function unit 22, and an SIP function unit 23.

Figure 4:
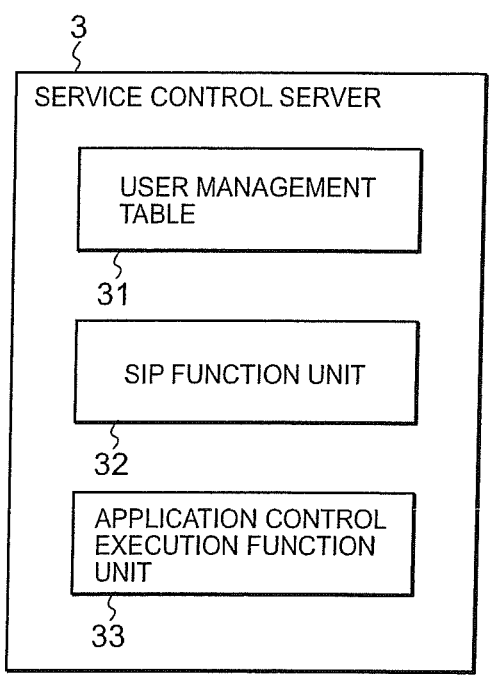
FIG. 4 is a block diagram showing an example of a service control server shown in FIG. 1.

FIG. 4 is a block diagram showing an example of the service control server 3 shown in FIG. 1. In FIG. 4, the service control server 3 includes a user management table 31, an SIP function unit 32, and an application control execution function unit 33.

Figure 5:
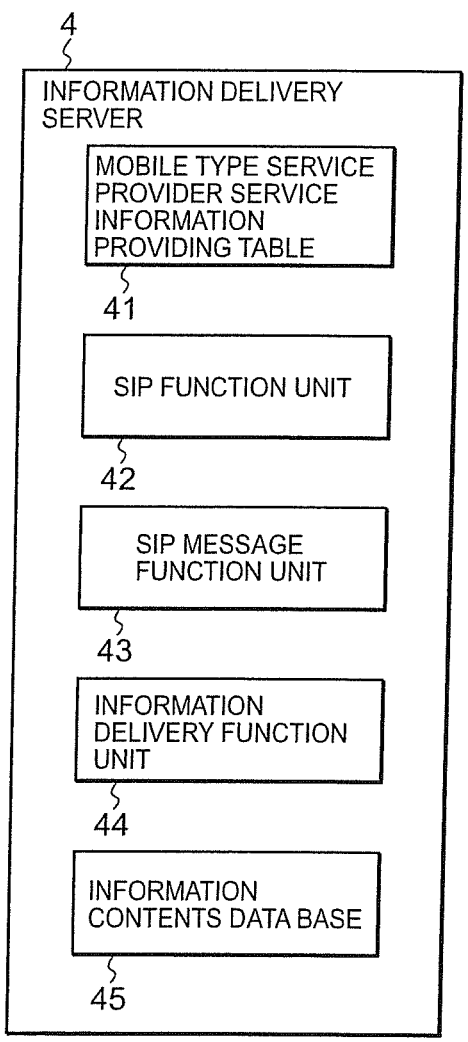
FIG. 5 is a block diagram showing an example of an information delivery server shown in FIG. 1.

FIG. 5 is a block diagram showing an example of the information delivery server 4 shown in FIG. 1. In FIG. 5, the information delivery server 4 includes a mobile type service provider service information providing table 41, an SIP function unit 42, an SIP message function unit 43, an information delivery function unit 44, and an information contents data base 45.

Figure 6:
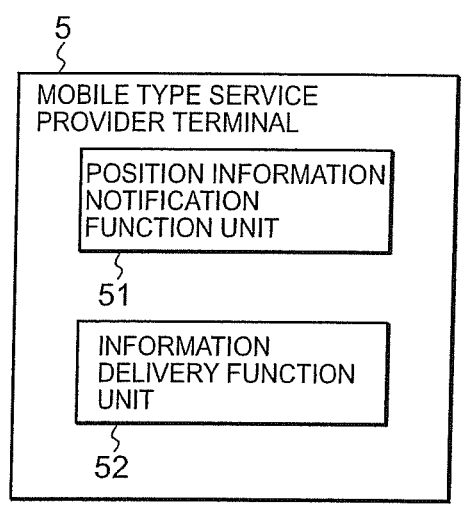
FIG. 6 is a block diagram showing an example of a mobile type service provider terminal shown in FIG. 1.

FIG. 6 is a block diagram showing an example of the mobile type service provider terminal 5 shown in FIG. 1. In FIG. 6, the mobile type service provider terminal 5 includes a position information notification function unit 51 and an information delivery function unit 52.

FIG. 7 is a view showing an example of a message according to the first embodiment of the present invention, and FIG. 8 is a view showing an example of the mobile type service provider status management table 21 shown in FIG. 3. FIG. 9 is a view showing an example of the user management table 31 shown in FIG. 4, and FIG. 10 is a view showing an example of the mobile type service provider service information providing table 41 shown in FIG. 5.

An arrangement and an operation of the information delivery system according to the first exemplary embodiment of the present invention will be explained with reference to FIGS. 1 to 10.

The network 100 is an IP (Internet Protocol) network provided by a communication firm to guarantee a communication band and communication quality. The network 100 has a function for controlling a communication session by SIP to guarantee the communication band and the communication quality between servers and terminals (clients).

The network 100 provides communication functions between the servers and the terminals (clients), that is, a unicast communication as one-to-one communication therebetween, a multicast communication as one-to-specified multiple communication therebetween, and a broadcast communication as one-to-unspecified multiple communication therebetween. Further, the network 100 can send and receive a message relating to the presence function between the servers and the terminals (clients) using SIP.

The respective subscriber terminals (1-1, 1-2, ..., 1-N), the presence management server 2, the service control server 3, and the information delivery server 4 have the SIP function units 11, 23, 32 and 42, respectively so that the communication band and the communication quality thereof are guaranteed in the network 100 and request a session control to the network 100 by SIP. Note that the SIP function unit 23 of the presence management server 2 and the SIP function unit 32 of the service control server 3 have an SIMPLE (SIP for Instant Messaging and Presence Leveraging Extensions) function prescribed by RFC (Request For Comment) 3265.

The respective subscriber terminals and the service control server 4 have the SIP message function units 12 and 43 which make use of the MESSAGE function of SIP provided by the network 100.

Each of the subscriber terminals has the application function unit 13 which shows a WEB browser function, a video reproducing function, a phone call function by transmission and reception, a phone call function by a phone making use of transmission and reception and a video, and a function for displaying a text information message.

Further, each of the subscriber terminals also has the display function unit 14 which simultaneously displays the WEB browser function, the video reproducing function, the phone call function by transmission and reception, the phone call function by the phone making use of transmission and reception and the video, and the function for displaying the text information message on a plurality of monitors and TV screens used by the subscribers.

The mobile type service provider terminal 5 has the position information notification function unit 51, which detects the position thereof by GPS (Global Positioning System), PHS (Personal Handy-phone System), RFID (Radio Frequency Identification Data), and the like, and the information delivery function unit 52 for delivering information from the terminal thereof.

The area (#A) 202 and the area (#N) 201 are certain specific areas, and detecting function units (not shown) are arranged at a plurality of locations in each of the area to detect the existence of the mobile type service provider terminal 5, that is, the presence of the mobile type service provider in these areas by GPS, PHS, RFID, and the like.

When the detecting function units located in the area (#A) 202 and the area (#N) 201 detect the mobile type service provider terminal 5, they notifies the presence management server 2 of the change of status of the presence through the network 100.

The presence management server 2 includes the mobile type service provider presence management function unit 22 for managing the presence of the mobile type service provider terminal 5. When the status of the presence of the mobile type service provider terminal 5 changes, the mobile type service provider presence management function unit 22 of the presence management server 2 sends a change of status notification to the service control server 3.

In general, the areas (#A) 202, (#N) 201 and the mobile type service provider terminal 5 act as a presence user agent, the presence management server 2 acts as a presence server, and the service control server 3 acts as a watcher.

The information delivery server 4 has the information delivery function unit 44 for delivering videos and WEB and sending a text information message to the respective subscriber terminals.

The service control server 3 has the application control execution function unit 33 for executing the application control (control of the application function unit 13) of the respective subscriber terminals.

A message definition example, which is used by the service control server 3 to control the applications of the subscriber #1 terminal 1-1, the subscriber #2 terminal 1-2, . . . , the subscriber #N terminal 1-N, will be explained with reference to FIG. 7. In FIG. 7, a message m is composed of a mobile type service provider ID (Identification Data) m1, a command m2, a message type m3, and a message body m4.

The mobile type service provider ID m1 is used to provide each of mobile type service providers with ID and to recognize and determine which mobile type service provider controls a subscriber terminal. The command m2 defines command information for the service control server 3 to control the application of the subscriber terminal. The command m2 includes the following types of commands:

Command for automatically starting an application, accumulating (caching) information relating to the control of the application, and updating the application being displayed;

Command for registering the information for controlling the application to a database held by the subscriber terminal or deleting the information held to the database;

Command for automatically controlling the transmission from a self-terminal and the reception from an opponent terminal to the self-terminal for a phone call function;

Command for turning off a phone call status;

Command for controlling the information set to the subscriber terminal and the mobile type service provider terminal;

Command for finishing the application started by the subscriber terminal; and

Command for notifying the status of a controlled terminal.

The message type m3 shows information for accessing the information delivery server 4, and specific information corresponding to the message type m3 is described in the message body m4. The message type m3 includes the following types of messages:

WEB URL (Uniform Resource Locator) for accessing a WEB server;

VoD URL for accessing a video delivery VoD (Video on Demand) by the unicast;

Multicast group address for accessing a video delivery by the multicast and the broadcast;

Text information showing that a phone number and a message are used to make a phone call; and Information for controlling a terminal.

The message body m4 describes the specific information of the contents defined by the message type m3.

Figure 11:
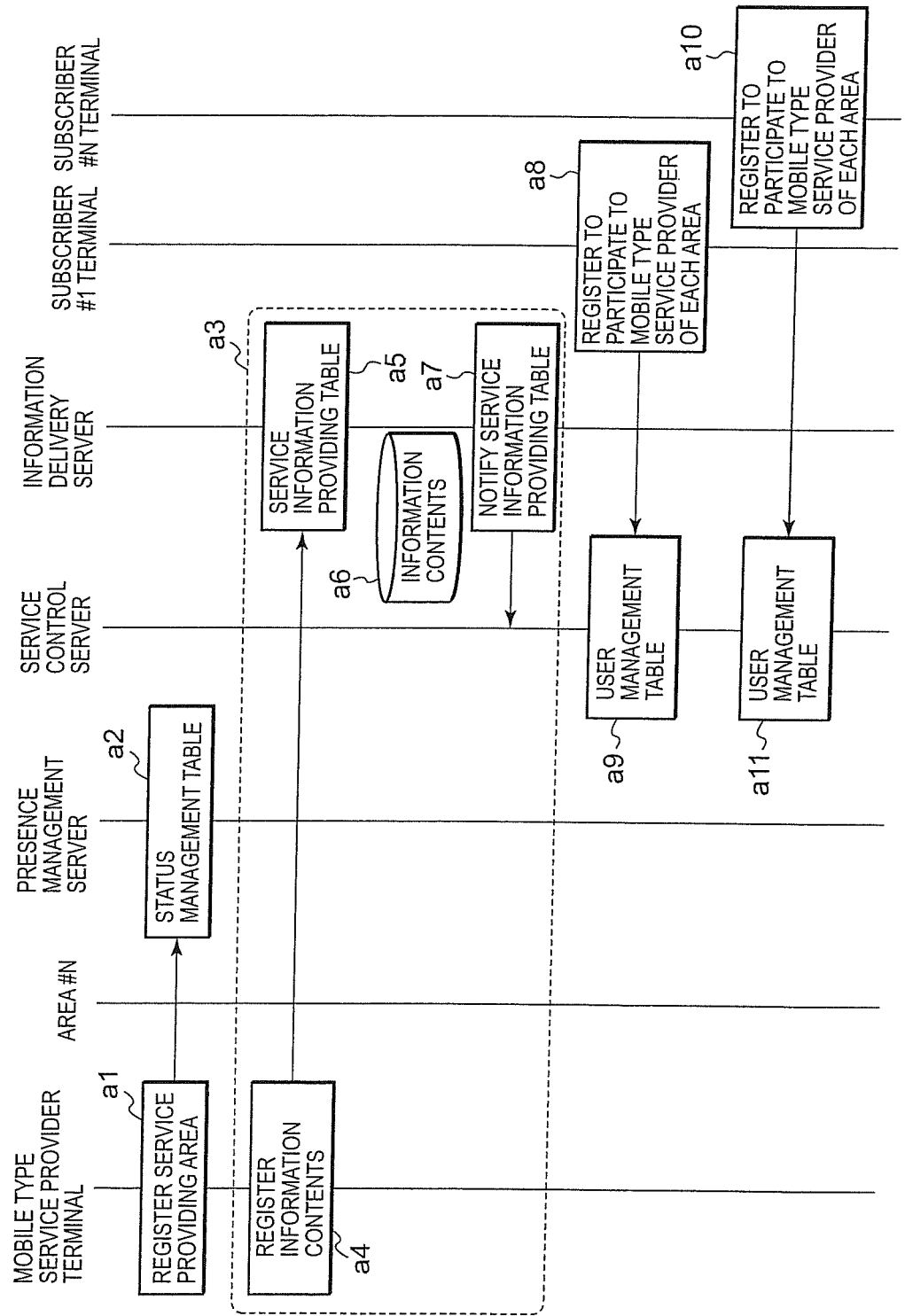
FIG. 11 is a sequence chart showing an operation of the information delivery system according to the first exemplary embodiment of the present invention.

FIG. 11 is a sequence chart showing the operation of the information delivery system according to the first exemplary embodiment of the present invention. The operation of the information delivery system according to the first exemplary embodiment of the present invention will be explained with reference to FIGS. 1 to 11.

The network 100 provided by the communication firm acts as the basis for providing a function for controlling a session between a server and a terminal (clients) by SIP, a function for sending and receiving a message (SIP/MESSAGE) between a server and a terminal (client), and a presence function for generally notifying the existence and the status of everything using SLP. However, since the operations of these functions are well known, the illustration and the explanation thereof are omitted.

Before a service is stared, the mobile type service provider terminal 5 registers a service providing area to the presence management server (a1 of FIG. 11).

The presence management server 2 creates the status management table (mobile type service provider status management table 21) of the mobile type service provider terminal 5 (a2 of FIG. 11).

As shown in FIG. 8, the mobile type service provider status management table 21 is composed of an area information region 211, a mobile type service provider region 212, and a status region 213. The area information region 211 stores the area information for managing the status of the mobile type service provider terminal 5, and the mobile type service provider region 212 stores the information of a service provider for providing a service in the area.

The mobile type service provider terminal 5 registers an area, in which it desires to provide a service, to the area information region 211 and the mobile type service provider region 212 of the mobile type service provider status management table 21 (process a1 of FIG. 1).

The status region 213 shows that the mobile type service provider terminal 5 exists in the area. The status region 213 shown in FIG. 8 shows an example that the existence of the terminal 5 in the area is managed as "on-line" and the non-existence of the terminal 5 in the area is managed as "off-line".

When the presence of the mobile type service provider terminal 5 is detected in an area, it registers the information contents, which it desires to be notified to subscribers, to the information delivery server 4 (a4 of FIG. 11). The information delivery server 4 stores the information contents registered from the mobile type service provider terminal 5 to the information contents data base 45 (a6 of FIG. 11).

The information delivery server 4 creates the mobile type service provider service information providing table 41 shown in FIG. 10 and manages the information contents of respective mobile type service providers. In FIG. 10, the mobile type service provider service information providing table 41 is composed of an area information region 411, a mobile type service provider region 412, a contents list region 413, a type region 414, and a contents access information region 415.

The area information region 411 stores the area information for managing the status of the mobile type service provider terminal 5. The mobile type service provider region 412 stores the information of the service providers which provides a service in the area. The correspondence between the area information region 411 and the mobile type service provider region 412 is registered to the presence management server 2 by the processing a2 of FIG. 11 and mapped likewise the correspondence between the area information region 211 and the mobile type service provider region 212 of the created mobile type service provider status management table 21.

The contents list region 413 stores the title name of the information which is delivered to the subscribers by the information delivery server 4. The contents access information region 415 stores the access information to the information contents.

The information in the contents list region 413 and the information in the contents access information region 415 are mapped in the message body m4 of the message m as WEB URL, VoD URL, the multicast group address, and the text information of the message.

The type region 414 stores the types of information delivered to the subscribers, that is, WEB, the video delivery (VoD), the video delivery (multicast, broadcast), and the text information. The information of the type region 414 is mapped to the message type m3 of the message m.

Since it is the premise of the first embodiment to provide the service to the clients by the mobile type service provider, "automatic" for displaying information to the clients at a real time is mapped to the command m2 of the message m.

On the completion of creation of the mobile type service provider service information providing table 41, the information delivery server 4 notifies the service control server 3 of the information (a7 of FIG. 11). The service control server 3 creates the message m of the message definition example shown in FIG. 7 with reference to the information notified from the information delivery server 4 and delivers it to the subscribers.

In contrast, the subscriber #1 terminal 1-1 and the subscriber #N terminal 1-N on the subscriber side perform a participation registration to receive the service of the mobile type service provider of each area (a8 and a10 of FIG. 11).

On receiving the participation registration from the subscribers, the service control server 3 creates the user management table 31 (a9 and a11 of FIG. 11). As shown in FIG. 9, the user management table 31 is composed of an area information region 311, a mobile type service provider region 312, and a service utilizing user region 313.

The area formation region 311 stores the area information for managing the status of the mobile type service provider terminal 5. The mobile type service provider region 312 stores the information of the service provider which provides a service in the area. The service utilizing user region 313 stores the information of the subscribers whose participation to the service is registered.

The correspondence between the area information region 311 and the mobile type service provider region 312 is mapped by the processing a2 of FIG. 11 likewise the correspondence between the area information region 211 and the mobile type service provider region 212 of the mobile type service provider status management table 21 which is registered to the presence management server 2 and created.

As described above, the subscribers previously register to participate to the service of the mobile type service provider which is provided in the area in which the subscribers can use the service.

Figure 12:
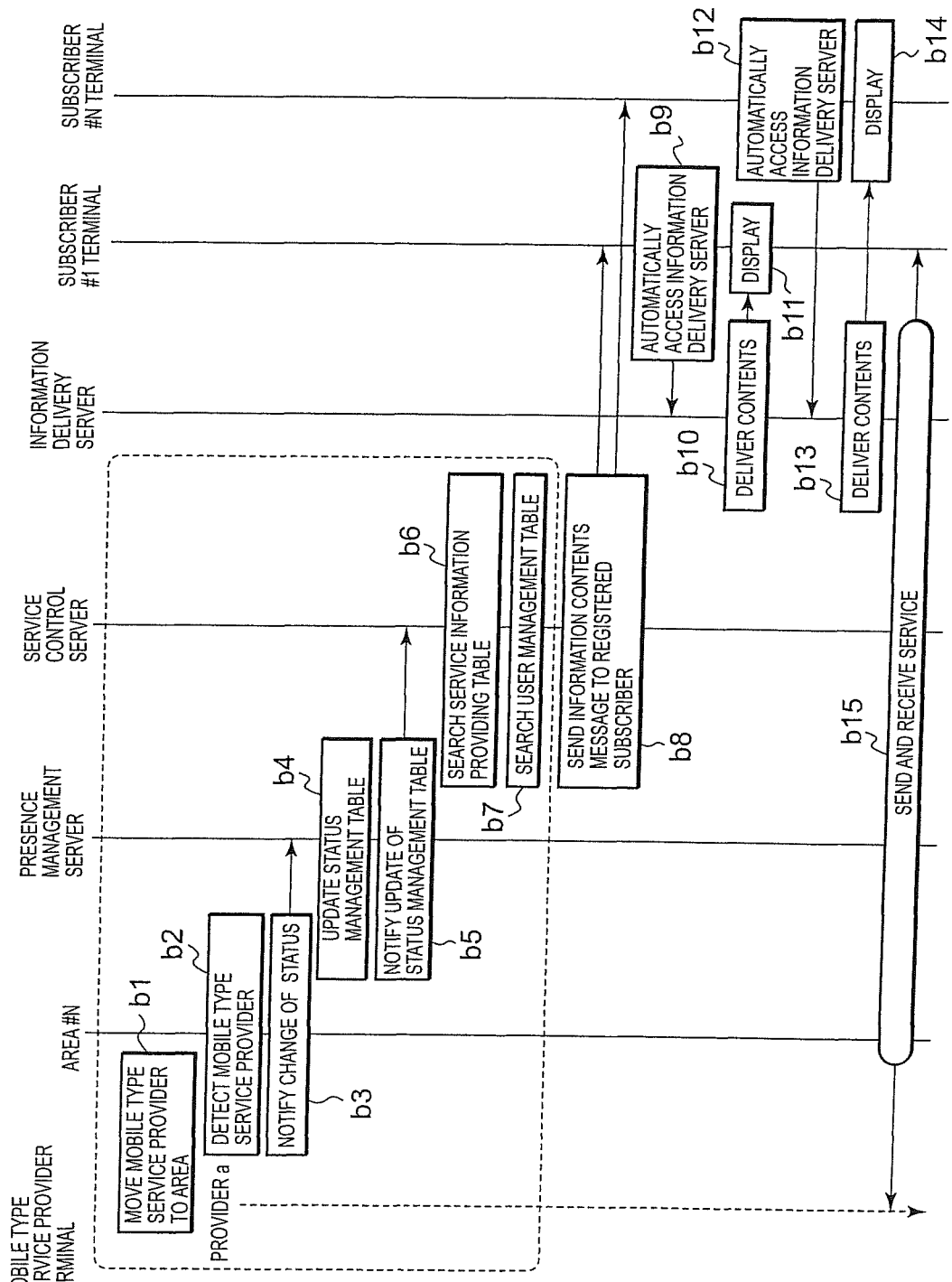
FIG. 12 is a sequence chart showing an operation of the information delivery system according to the first exemplary embodiment of the present invention.

FIG. 12 is a sequence chart showing an operation of the information delivery system according to the first exemplary embodiment of the present invention. FIG. 12 shows the operation until the mobile type service provider terminal 5 moves to the area (#N) 201 and provides the service to the subscribers. The operation of the information delivery system according to the first exemplary embodiment of the present invention will be explained with reference to FIGS. 1 to 10 and FIG. 12.

The mobile type service provider terminal 5 moves to the area (#N) 201 (b1 of FIG. 12). It is assumed, for example, that a "provider a" as the mobile type service provider moves. The mobile type service provider (provider a) is detected in the area (#N) 201 by related technologies such as GPS, PHS, RFID, and the like (b2 of FIG. 12).

It is notified from the area (#N) 201 to the presence management server 2 that the presence status of the mobile type service provider (provider a) changes (b3 of FIG. 12). On receiving the notification, the presence management server 2 updates the status of the mobile type service provider status management table 21 (b4 of FIG. 12). The presence management server 2 notifies the service control server 3 that the mobile type service provider status management table 21 is updated (b5 of FIG. 12). In this case, the presence management server 2 notifies the service control server 3 of the change of the presence status by the SIP function unit 23 using the function of SIP/SIMPLE. Note that since the SUBSCRIBE/NOTIFY/RESPONSE method as the function of SIP/SIMPLE is a well-known technology, the explanation thereof is omitted.

On receiving the notification of the change of status of the "provider a" in the area (#N) 201, the service control server 3 searches the mobile type service provider service information providing table 41 of the information delivery server 4 and searches the contents which are provided by the "provider a" to the subscribers in the area (#N) 201 (b6 of FIG. 12). Subsequently, the service control server 3 searches the user management table 31 and searches the subscribers who register to be provided with the service from the "provider a" in the area (#N) 201 (b7 of FIG. 12). The service control server 3 creates the information to the information delivery server 4, to which the information contents which the "provider a" desires to deliver to the subscribers participating to the service are registered, as the message m of the message definition example shown in FIG. 7 and sends the information to the subscribers by the MESSAGE function of SIP (b8 of FIG. 12).

The subscriber #1 terminal 1-1 and the subscriber #N terminal 1-N, which receive the information from the mobile type service provider terminal 5 (provider a), automatically access the information delivery server 4 with reference to the received message m (b9 and b12 of FIG. 12).

The information delivery server 4 delivers the information to the subscriber #1 terminal 1-1 and the subscriber #N terminal 1-N (b10 and b13 of FIG. 12). The subscriber #1 terminal 1-1 and the subscriber #N terminal 1-N display the information received from the information delivery server 4 on monitors and TV screens used by the subscribers (b11 and b14 of FIG. 121).

The subscribers are provided with the service from the mobile type service provider terminal 5 (provider a) by selecting whether or not they receive the service therefrom with reference to the displayed information (b15 of FIG. 12).

As described above, in the first exemplary embodiment, since the status of the mobile type service provider terminal 5, which provides the service while it moves, is managed as the presence information, the clients (subscriber terminals) can be provided with the service of the mobile type service provider in the service providing area which they registered.

In the first exemplary embodiment, since the mobile type service provider previously registers the information provided thereby to the information delivery server 4 as the information contents and delivers the information contents to the subscribers according to the movement of the terminal of the provider, the clients (client terminals) can accurately recognize the status of service of the mobile type service provider.

Further, in the first exemplary embodiment, since whether or not the mobile type service provider exists in a particular area is managed as the presence information and the information contents are delivered to the clients (client terminals) who register to be provided with the service, the mobile type service provider can obtain the clients (client terminals) who are connected to the fixed network as well as wait that the mobile type service provider comes to an adjacent area and provides the service and provides the service to the clients (client terminals).

Second Exemplary Embodiment

Figure 13:
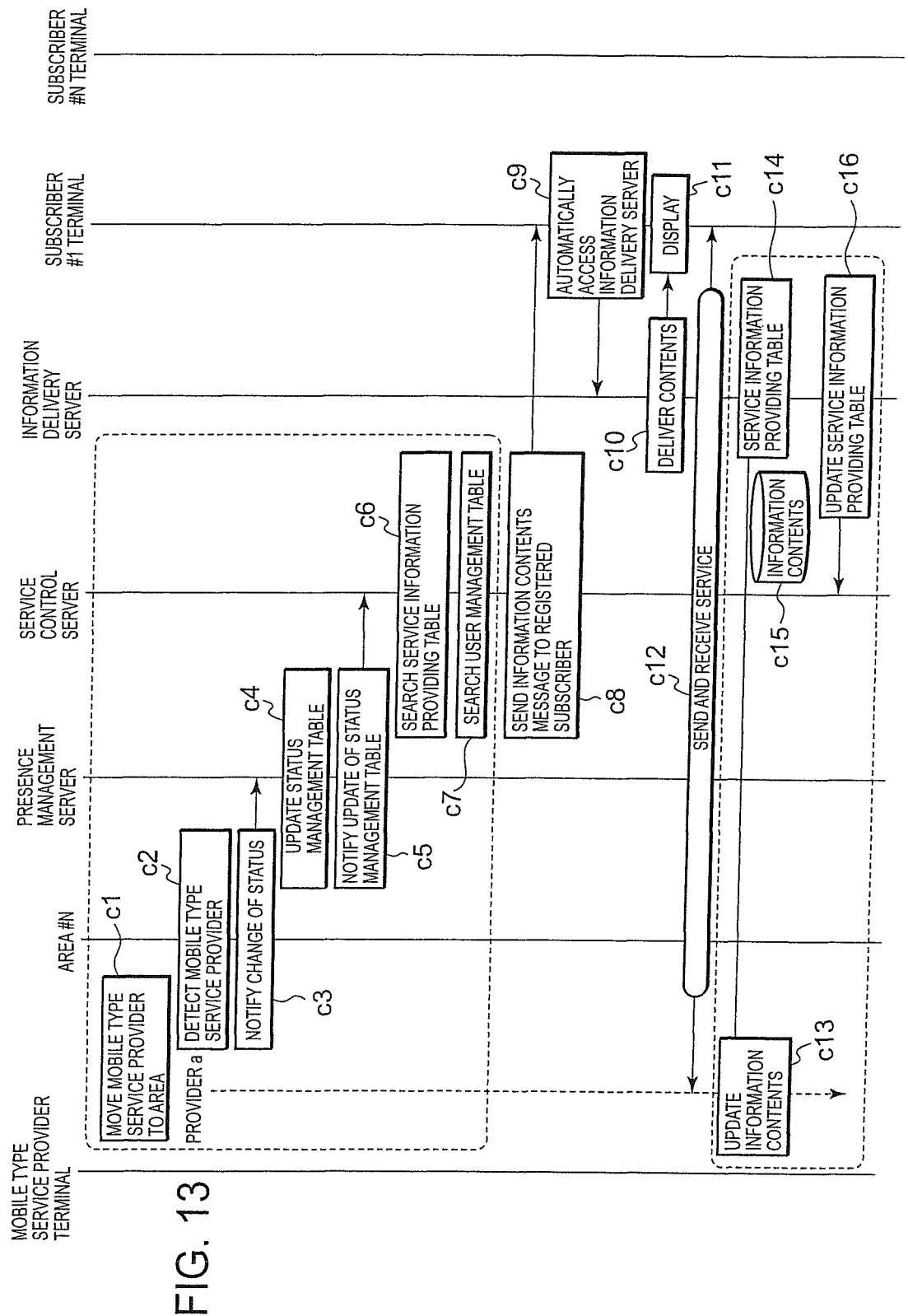
FIG. 13 is a sequence chart showing an operation of an information delivery system according to a second exemplary embodiment of the present invention.

FIG. 13 is a sequence chart showing an operation of an information delivery system according to a second exemplary embodiment of the present invention. The information delivery system according to the second exemplary embodiment of the present invention has the same arrangement as the information delivery system according to the first exemplary embodiment shown in FIG. 1, and the respective components of the second exemplary embodiment are the same as those of the first exemplary embodiment. However, the operation of the second exemplary embodiment of the present invention is different from that of the first exemplary embodiment described above in that a mobile type service provider terminal 5 updates information contents as to a service in an area (#N) 201.

The operation of the information delivery system according to the second exemplary embodiment of the present invention will be explained below with reference to FIGS. 1 to 10 and FIG. 13. Note that processings c1 to c12 of FIG. 13 are the same as processings b1 to b11 and b15 of FIG. 12.

The mobile type service provider terminal 5 provides a service to subscribers while it moves, and when the status of the service provided while the terminal moves, for example, the type and the number of a commodity to be provided to the clients change, the mobile type service provider terminal 5 updates the information contents provided thereby by registering them to an information delivery server 4 again (c13 of FIG. 13).

The information delivery server 4 simultaneously updates a mobile type service provider service information providing table 41 (c14 of FIG. 13) and stores the information updated by the mobile type service provider 5 to the information contents (c15 of FIG. 13) as well as notifies a service control server 3 that the mobile type service provider service information providing table 41 is updated (c16 of FIG. 13).

As described above, in the second exemplary embodiment, the mobile type service provider can update the information which it desires to deliver to the previously registered clients even while it moves. The mobile type service provider can deliver the latest information to the clients even while it moves.

Note that, in the present invention, the mobile type service provider terminal 5 includes a position information notification function for causing GPS, PHS, RFID, and the like to detect and to notify the position information thereof and an information delivery function for delivering information therefrom. Thus, it is also possible that the information delivery function causes the mobile type service provider to deliver the information contents to the subscribers by visualizing the status of the commodity handled thereby as a video making use of a camera and the like even while it moves.

Further, in the present invention, it is also possible that the mobile type service provider terminal 5 notifies the subscribers of the phone number of a mobile body held by the service provider as the information contents to be delivered to the subscribers so that the service provider directly receives a phone call from the clients making use of the service and provides a service to the clients according to the request of them.

The present invention can be applied to such a way of use that the service provider, which provides the service to the clients while it moves, notifies the clients that the service provider moves to an area, in which the clients can be suitably provided with the service, as presence information as well as provides the service, which can be provided thereby, to the clients as the information contents.

Further, the present invention can be applied to a way of use for providing the service to the clients when the service provider moves and comes to, for example, an adjacent area so that the clients can obtain the service at the minimum cost.

To explain more specifically, the present invention can be applied to such business models in which the clients can be provided with the service in their home when the mobile type service provider comes to the vicinity of them without the need of visiting the firm such as a service for picking up goods to be delivered in a home delivery business, a mobile medical service, a routine patrol of a police, a maintenance and repair service of AV (Audio Visual) home appliances and personal computers, and the like.

While the present invention has been particularly shown and described with reference to exemplary embodiments thereof, the present invention is not limited to these embodiments. It will be understood by those of ordinary skill in the art that various changes in form and details may be made therein without departing from the spirit and scope of the present invention as defined by the claims.

What is claimed is:

1. An information delivery system comprising:
a mobile type service provider terminal which moves in a service providing area and provides a service to a subscriber terminal in the vicinity of the service providing area;
a presence management server that manages presence information of the service provider terminal;
an information delivery server that previously registers and manages information which is desired to be delivered from the service provider terminal to the subscriber terminal; and
a service control server that notifies the subscriber terminal participating to the service of the service provider of the delivery of the information registered to the information delivery server when a status of presence of the service provider changes,
wherein the information managed by the information delivery server can be updated while the service provider terminal moves in the service providing area.

2. The information delivery system according to claim 1, wherein the presence management server manages whether or not the service provider terminal exists in a particular area as presence information.

3. The information delivery system according to claim 1, wherein a message is defined between the service control server and the subscriber terminal making use of the MESSAGE function of SIP (Session Initiation Protocol).

4. The information delivery system according to claim 3, wherein the service control server pushes application control information to the subscriber terminal making use of the message defined between the subscriber terminal and the service control server and controls the application provided to the subscriber terminal.

5. The information delivery system according to claim 3, wherein the service control server delivers the message defined between the subscriber terminal and the service control server to the subscriber terminal.

6. The information delivery system according to claim 1, wherein the information delivery server comprises table means for managing the information of the service providing area, the information of the service provider, contents list information, and contents type information.

7. The information delivery system according to claim 1, wherein the service control server comprises table means for managing the information of the service providing area, the information of the service provider and the information of a service utilizing user.

8. An information delivery method used to an information delivery system, wherein:
a mobile type service provider terminal moves in a service providing area and provides a service to a subscriber terminal in the vicinity of the service providing area;
a presence management server manages presence information of the service provider terminal;
an information delivery server previously registers and manages information in which the information delivery server desires to deliver from the service provider terminal to the subscriber terminal;
a service control server notifies the subscriber terminal participating to the service of the service provider of the delivery of the information registered to the information delivery server when a status of presence of the service provider changes; and
the information managed by the information delivery server can be updated while the service provider terminal moves in the service providing area.

9. The information delivery method according to claim 8, wherein the presence management server manages whether or not the service provider terminal exists in a particular area as presence information.

10. The information delivery method according to claim 8, wherein a message is defined between the service control server and the subscriber terminal making use of the MESSAGE function of SIP (Session Initiation Protocol).

11. The information delivery method according to claim 10, wherein the service control server pushes application control information to the subscriber terminal making use of the message defined between the subscriber terminal and the service control server and controls the application provided to the subscriber terminal.

12. The information delivery method according to claim 11, wherein the definition of the message includes the identification information of the service provider, a command for controlling the application, and a message type and a message body showing the contents of the command.

13. The information delivery method according to claim 12, wherein a first command for automatically starting the application and a second command for updating an application being displayed are included as the command.

14. The information delivery method according to claim 12, wherein a type of the message type includes WEB URL (Uniform Resource Locator) for accessing a WEB server, VoDURL for accessing a video delivery VoD (Video on Demand) by the unicast, multicast group address for accessing a video delivery by the multicast and the broadcast, and text information showing that a phone number and a message are used to make a phone call.

15. The information delivery method according to claim 10, wherein the service control server delivers the message defined between the subscriber terminal and the service control server to the subscriber terminal.

16. The information delivery method according to claim 8, wherein the information delivery server comprises table means for managing the information of the service providing area, the information of the service provider, contents list information, and contents type information.

17. The information delivery method according to claim 8, wherein the service control server comprises table means for managing the information of the service providing area, the information of the service provider, and the information of a service utilizing user.

* * * * *